Aug. 24, 1954

T. W. LAKE 2,687,187

LUBRICATOR FOR PNEUMATIC TOOLS

Filed June 21, 1951

Toivo W. Lake
INVENTOR.

BY Clarence A. O'Brien
and Harvey B. Jacobson
Attorneys

Patented Aug. 24, 1954

2,687,187

UNITED STATES PATENT OFFICE 2,687,187

LUBRICATOR FOR PNEUMATIC TOOLS

Toivo W. Lake, Pennsville, N. J.

Application June 21, 1951, Serial No. 232,814

2 Claims. (Cl. 184—55)

The present invention relates to certain new and useful improvements in lubricators and has more particular reference to one which is especially and suitably designed for installation in a pressured line between a pneumatic tool and a compressor and the obvious purpose of the invention is to supply a correct amount of lubricant to the stated tool when the tool is in operation and to automatically cut-off the supply of lubricant when the supply of air is cut-off.

Lubricators in this particular line of endeavor are not, of course, new. The art to which the invention relates offers many and varied styles and forms of pneumatic tool lubricators. The object of the present invention is to structurally, functionally and otherwise improve upon prior art lubricators and, in so doing, to provide an unusually simple and practical construction in which manufacturers and users will find their primary requirements and needs fully met, contained, and effectually available.

Another object of the invention is to provide an aptly constructed lubricator which is characterized by a casing providing a reservoir capable of holding a work-day supply of lubricant, said casing embodying a conduit which functions as a manifold and which has convenient pipe connections at opposite ends to accommodate the pipe sections or hoses which are adapted to be communicatively joined thereto.

Another object of the invention is to provide a construction, as stated, wherein a simple spray nozzle is embodied in the manifold, the discharge end of the nozzle terminating in close spaced proximity to one of the pipe connections and the intake end, which is like an elbow, is connected with the bottom of the reservoir through the medium of a spring-closed suction-opened ball check valve, whereby the valve is opened when the suction is "on" and is closed as soon as the suction is turned "off."

More specifically, novelty is predicated on the aforementioned ball check valve arrangement which is cooperable with the nozzle and which is centrally located at the bottom of the reservoir directly beneath a filler neck which is provided at the top of the casing, said filler neck being closed by a screw plug, said plug having a vent and being, in addition, equipped with a suction-opened spring-closed ball check valve.

Other objects and advantages will become more readily apparent from the following description and the accompanying sheet of illustrative drawings.

In the accompanying drawings, wherein like numerals are employed to designate like parts throughout the views.

Figure 1:
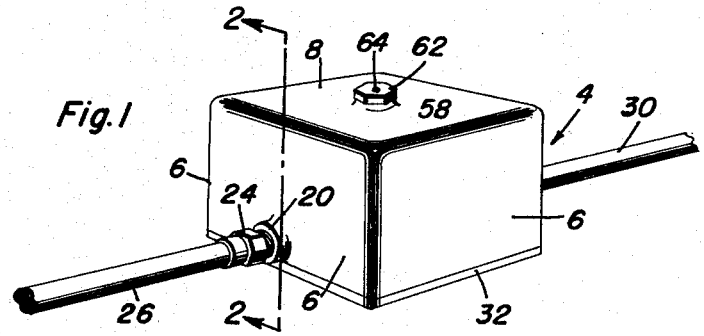
Figure 1 is a perspective view of a lubricator constructed in accordance with the principles of the present invention and showing fragmentary portions of pipes or hoses operatively connected thereto.
Figure 2:
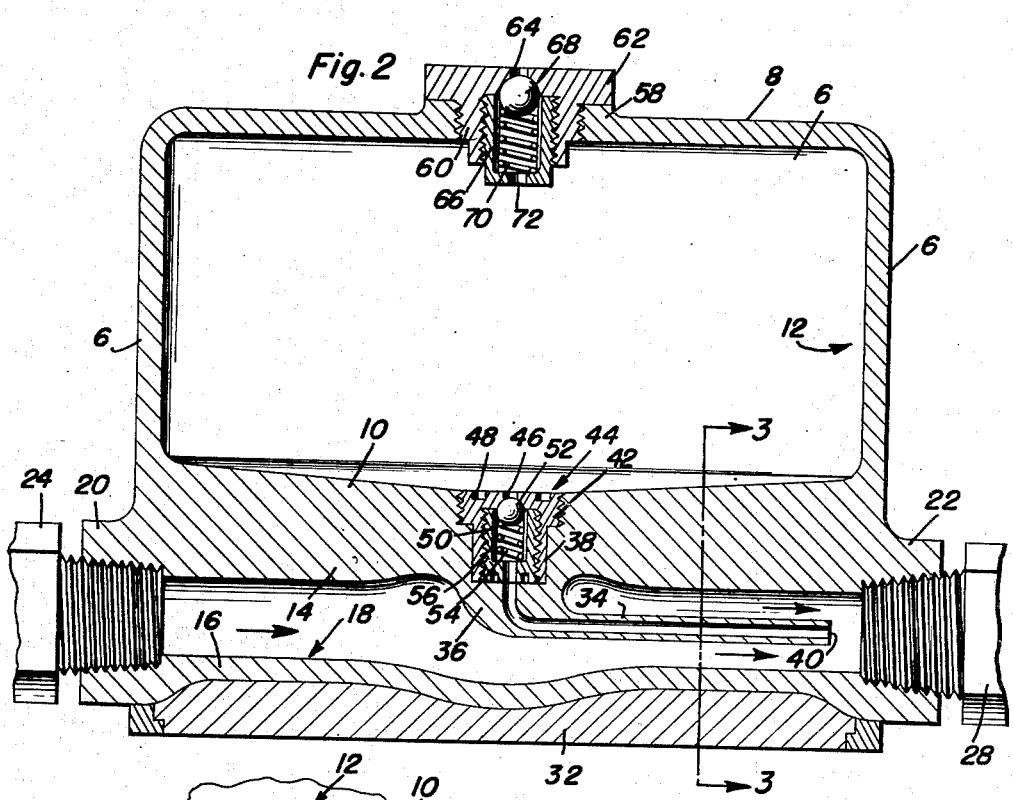
Figure 2 is an enlarged central vertical sectional and elevational view taken approximately on the vertical line 2—2 of Figure 1, looking in the direction of the arrows.
Figure 3:
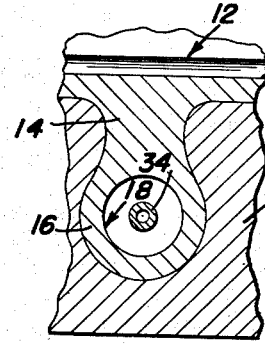
Figure 3 is a fragmentary cross-section on the line 3—3 of Figure 2, looking in the direction of the arrows.

The casing is of rectangular or box-like form and is denoted by the numeral 4 and is characterized by a single casting having vertical side walls 6 and a substantial flat top wall 8. The main or principal bottom is best shown in Figure 2 and is denoted by the numeral 10 and this cooperates with the stated walls in defining the lubricant containing reservoir 12 which, in practice, is adapted to contain a quart or so of lubricating oil. The underside of the bottom, as best shown in Figure 3, has a web 14 which is fashioned into a cylindrical, or approximately so, conduit 16 defining an open ended passage or manifold 18. This manifold terminates at opposite ends in appropriate screw-threaded connections 20 and 22. The connection 20 serves to accommodate a coupling 24 on the compressor line or hose 26. The connection 22 serves to accommodate a similar coupling 28 carried by the pneumatic tool pipe or hose 30. The numeral 32 designates a false bottom or insert which is properly fitted into the casing and encloses the manifold and provides a heavy flat surfaced supporting base as shown. Also formed in the casing and located in the manifold is the spray type restricted nozzle 34. The nozzle has an elbow connection at 36 with a well or socket 38 formed in the reservoir bottom 10. The discharge end of the nozzle 40 terminates in close spaced proximity to the pipe connection 22. The upper end portion of the socket is counter-bored to accommodate the screw threaded portion 42 of a sleeve like fitting 44 which is screwed into the socket in the manner shown. The fitting has an outlet port 46 for the lubricant and is provided with a spanner wrench socket 48. It is also screw threaded to accommodate a screw cup 50 carrying a ball check valve 52 and a coil spring 54 which normally closes the valve. When the valve is open the lubricant seeps down through the diametrically opposite screws or passages 56 in an obvious manner. When the tool is "on" the suction plays upon the discharge end 40 of the nozzle and sucks the lubricant through the nozzle where it is sprayed into the line 30 which leads to the tool (not shown). The suction, of course, opens the ball check valve 52. As soon as the suction is "off" the spring closes the valve.

The top wall 8 is provided with a screw threaded filler neck or hole 58 which accommodates a screw plug 60 having a suitable grip 62 provided with a vent or port 64. The screw plug is internally screw threaded to accommodate a cage or cup 66 carrying a ball check valve 68 and a return spring 70. The opening in the cup is denoted at 72. Here again the valve is opened and closed by the suction in the manifold 18. The filler neck is sufficiently large for convenient filling of the reservoir and also permits access to be had to the fitting 44 and valve means carried thereby.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention what is claimed as new is:

1. A lubricator for installation in an air line between a pneumatic tool and a compressor comprising a casing having bottom, top and side walls defining a lubricant containing reservoir, said bottom having a conduit therethrough providing a manifold, the latter having individual pipe connections at opposite ends, an attenuated vacuum controlled lubricant delivery nozzle integral with said bottom wall and situated concentrically in said manifold and having its discharge end terminating in close spaced proximity to one of said pipe connections, the upper face of the bottom wall of said reservoir having a socket recessed therein and the intake end of said nozzle communicatively connecting with said socket, a ported fitting removably mounted in said socket and accessible by way of said reservoir, a spring closed vacuum opened ball check valve unit accessibly and removably mounted in said fitting, said top wall having a screw-threaded filler hole directly above and in alignment with said fitting, and a screw-plug closing said filler hole and provided with a vent and a spring closed ball check valve normally closing said vent.

2. A lubricator for installation in an air line between a tool and a compressor comprising a casing having bottom, top and side walls defining a liquid lubricant containing reservoir, said bottom wall having an open ended conduit therethrough providing a pressurized air passing manifold, the latter having pipe connections at its respective open ends, the interior upper surface of said bottom wall having an internally screw threaded socket recessed therein, the bottom of said socket terminating in a plane above the top plane of said manifold, a gravity and vacuum charged attenuated nozzle integral with said bottom wall and communicatively joined at one end with said socket, said nozzle extending laterally from the vertical axis of said socket and situated coaxially in the passage of said manifold, the discharge end of said nozzle terminating in close proximity to the air discharge end of said manifold so that the effluent pressured air column exerts a vacuum pull on the discharge end of said nozzle, the top wall of said casing having a filler hole in axial alignment with said socket, a screw-threaded ported fitting screwed into said socket and accessible by way of the reservoir and said filler hole, a spring closed vacuum opened ball check valve operatively mounted in said fitting, and a plug closing said filler hole, said plug being provided with vent openings and a spring closed vacuum opened ball check valve normally closing one of said vent openings.

References Cited in the file of this patent

UNITED STATES PATENTS

| Number | Name | Date |
|---|---|---|
| 2,073,009 | Hersey | Mar. 9, 1937 |
| 2,560,239 | O'Farrell | July 10, 1951 |

FOREIGN PATENTS

| Number | Country | Date |
|---|---|---|
| 652,562 | France | Mar. 11, 1929 |